US011001519B2

(12) United States Patent
Wang et al.

(10) Patent No.: US 11,001,519 B2
(45) Date of Patent: May 11, 2021

(54) VACUUM REFINING OF MOLTEN GLASS

(71) Applicant: Owens-Brockway Glass Container Inc., Perrysburg, OH (US)

(72) Inventors: Zhongming Wang, Ypsilanti, MI (US); Nicholas A Schoenrock, Toledo, OH (US); Ya-Cheng Lin, Perrysburg, OH (US); Udaya K Vempati, Perrysburg, OH (US); Earnest Iddings, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 145 days.

(21) Appl. No.: 15/922,539

(22) Filed: Mar. 15, 2018

(65) Prior Publication Data

US 2019/0284077 A1    Sep. 19, 2019

(51) Int. Cl.
| C03B 5/225 | (2006.01) |
| C03B 5/26 | (2006.01) |
| C03B 5/16 | (2006.01) |
| C03B 5/42 | (2006.01) |
| C03B 5/235 | (2006.01) |
| C03B 5/00 | (2006.01) |
| C03B 5/20 | (2006.01) |

(52) U.S. Cl.
CPC ........... *C03B 5/2252* (2013.01); *C03B 5/163* (2013.01); *C03B 5/2356* (2013.01); *C03B 5/262* (2013.01); *C03B 5/42* (2013.01); *C03B 5/005* (2013.01); *C03B 5/20* (2013.01)

(58) Field of Classification Search
CPC .............................. C03B 5/225; C03B 5/2257
See application file for complete search history.

(56) References Cited

U.S. PATENT DOCUMENTS

| 3,689,046 | A | | 9/1972 | De Bie et al. |
| 3,998,686 | A | | 12/1976 | Meiling et al. |
| 4,634,461 | A | | 1/1987 | Demarest, Jr. et al. |
| 4,820,329 | A | * | 4/1989 | Gunthner .................. C03B 5/00 65/134.4 |
| 4,875,917 | A | | 10/1989 | Lentz |
| 5,586,999 | A | * | 12/1996 | Kobayashi ................ C03B 5/16 65/134.3 |
| 6,029,475 | A | | 2/2000 | Abramov et al. |
| 6,119,484 | A | | 9/2000 | Takei et al. |
| 6,405,564 | B1 | * | 6/2002 | Takei .................... C03B 5/1675 65/134.2 |

(Continued)

FOREIGN PATENT DOCUMENTS

| EP | 0939058 A1 | 9/1999 |
| WO | WO 2012/093563 A1 | 7/2012 |

OTHER PUBLICATIONS

International Search Report and Written Opinion, Int. Serial No. PCT/US2019/021781, Int. Filing Date: Mar. 12, 2019, Applicant: Owens-Brockway Glass Container Inc., dated Jun. 24, 2019.

*Primary Examiner* — Lisa L Herring

(57) ABSTRACT

An apparatus and method of refining molten glass are disclosed. An upstream vessel contains molten glass, a downstream vessel is arranged downstream of the upstream vessel, and vacuum refining vessels are located between the upstream vessel and the downstream vessel and are in separate, alternating fluid communication with the upstream vessel and in separate, alternating fluid communication with the downstream vessel.

21 Claims, 2 Drawing Sheets

(56) References Cited

U.S. PATENT DOCUMENTS

| | | |
|---|---|---|
| 6,460,376 B1 * | 10/2002 | Jeanvoine ............... C03B 3/005 |
| | | 65/134.2 |
| 6,620,350 B2 | 9/2003 | Chen |
| 7,703,304 B2 | 4/2010 | Jeong et al. |
| 8,689,586 B2 | 4/2014 | Hirayama et al. |
| 2002/0062664 A1 | 5/2002 | Schmitt et al. |
| 2008/0187686 A1 | 8/2008 | Rodriguez Cuartas et al. |
| 2014/0260433 A1 * | 9/2014 | Dewet-Smith ........ C03B 5/2252 |
| | | 65/173 |
| 2015/0191387 A1 | 7/2015 | Bisson et al. |
| 2015/0266763 A1 | 9/2015 | Zhao et al. |
| 2018/0002214 A1 | 1/2018 | Gullinkala et al. |

\* cited by examiner

VACUUM REFINING OF MOLTEN GLASS

The present disclosure is directed to a molten glass vacuum degassing/refining apparatus and process.

BACKGROUND OF THE DISCLOSURE

Silica-based glass, such as soda-lime-silica glass, is prevalent in the manufacture of glass containers and other articles. Molten glass used to make such articles is conventionally prepared by melting various glass-forming materials in a furnace or tank at elevated temperature. During this process, gases (e.g., $SO_2$, $CO_2$, $H_2O$, etc) are produced, which may evolve to form undesirable gas bubbles, "blisters" or "seeds" within the molten glass. The process of removing gaseous inclusions from molten glass is referred to as "fining" or "refining" or "degassing."

Those skilled in the art will appreciate that there are a variety of ways to remove or prevent bubbles. These can include refining agents, high temperatures, and/or controlled pressures. In some cases, it is possible to grow bubbles so that they gradually rise to the surface of the molten glass and escape. Refining can occur inside or outside of a furnace or tank, such as in downstream refining chambers.

BRIEF SUMMARY OF THE DISCLOSURE

An apparatus to refine molten glass, in accordance with one aspect of the disclosure, includes an upstream vessel to contain molten glass, a downstream vessel arranged downstream of the upstream vessel, and a plurality of vacuum refining vessels located downstream of the upstream vessel in separate, alternating fluid communication therewith, and located upstream of the downstream vessel in separate, alternating fluid communication therewith. The refining vessels are not in direct fluid communication with one another, and wherein the refining vessels are operated in a mutually exclusive manner to provide a continuous flow of refined molten glass toward the downstream vessel.

A process for refining molten glass, in accordance with another aspect of the disclosure, includes (a) containing molten glass in an upstream vessel; (b) distributing the molten glass from the upstream vessel to a first of at least two vacuum refining vessels downstream of the upstream vessel, and vacuum refining the molten glass in the first vacuum refining vessel; and (c) discharging refined molten glass from a second of the at least two vacuum refining vessels into a downstream vessel, wherein the first and second vacuum refining vessels are in separate, alternating fluid communication with the upstream vessel, and wherein the first and second vacuum refining vessels are in separate, alternating fluid communication with the downstream vessel.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

As explained briefly in the Background, molten glass may contain a large amount of bubbles which desirably can be removed prior to forming into the desired product. Refining involves removing gaseous bubbles from the molten glass, mainly gases coming from decomposition and chemical reactions during the melting process. The process and apparatus for refining molten glass disclosed herein may be used to refine various silica-based glass compositions as well as glass precursor compositions, and may be retrofitted or incorporated into various glass manufacturing processes and various glass furnace designs.

Figure 1:
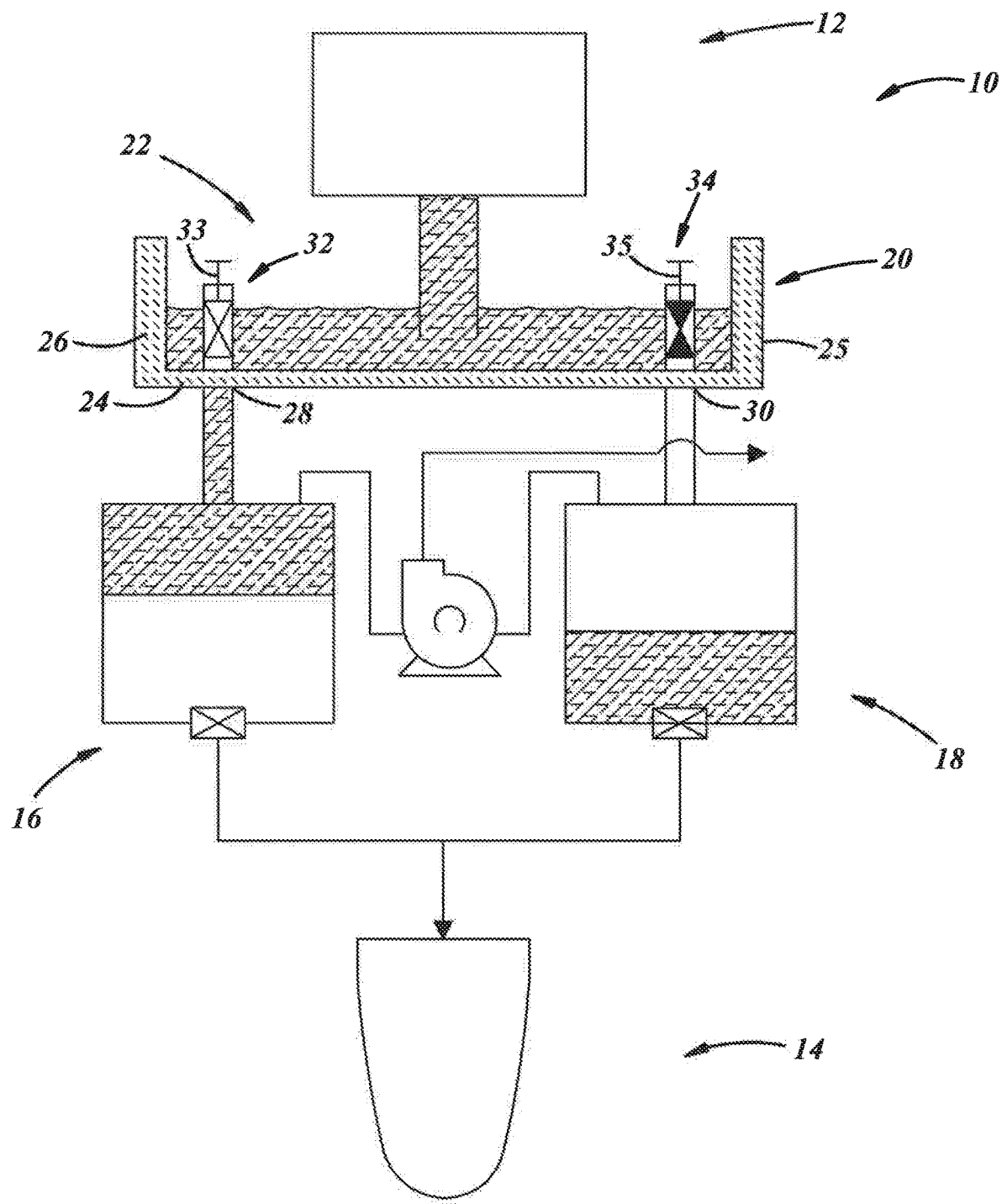
FIG. 1 is a schematic view illustrating a process and apparatus having an upstream vessel containing molten glass, a plurality of vacuum refining vessels located downstream of the upstream vessel, a reservoir between the upstream vessel and the refining vessels, and a downstream vessel to receive refined molten glass.

FIG. 1 illustrates a schematic view of an apparatus 10 and process for refining molten glass. The apparatus of FIG. 1 comprises an upstream vessel 12 for containing molten glass. Molten glass may be produced from batch glass raw materials and/or cullet. The upstream vessel 12 may include a furnace or tank. In some embodiments, the upstream vessel 12 is a glass melting apparatus, such as a vacuum induction melter or a submerged combustion melter.

Submerged combustion melting (SCM) is a type of melting used in glass manufacturing. In SCM, an air-fuel or oxygen-fuel mixture is injected directly into a pool of molten glass. Burners may be arranged at the bottom of the molten glass pool, and stimulate melting of incoming cullet and/or raw materials and combustion of the fuel from the bottom. As combustion gases bubble through the molten pool, they create a high-heat transfer rate and turbulent mixing of the raw materials and molten glass. Once the melted material achieves a uniform composition, it can then be drained from the upstream vessel to be further processed and/or used to form desired products.

The SCM technique yields intense combustion, direct-contact heat transfer as combustion gases bubble through the melt, and a high rate of heat transfer, giving high thermal efficiency. Accordingly, SCM uses less energy to melt the raw materials and can utilize a smaller melter and/or furnace as compared to other melting methods. Likewise, the molten glass spends less time in the melter. SCM systems can be simple and inexpensive because the SCM vessel is tolerant of a wide range in batch and cullet size, can accept multiple types of feed, and does not require perfect feed blending prior to introduction into the melter vessel.

The apparatus 10 also comprises a downstream vessel 14 arranged downstream of the upstream vessel 12. In some embodiments, the downstream vessel 14 is a molten glass conditioner, and molten glass leaving the downstream vessel 14 proceeds to a forming machine to make glass containers, or to a forehearth to produce glass gobs, or other distribution channels or conduits (which are not shown). In other embodiments, the downstream vessel 14 may include a reservoir, forehearth, or any other receptacle suitable to contain, treat, and/or distribute molten glass. For example, the downstream vessel 14 optionally includes a molten glass forehearth that distributes the refined molten glass to a further downstream process. Alternatively or additionally, the downstream vessel includes a molten glass conduit that delivers the refined molten glass to a forming machine.

The apparatus 10 further comprises a plurality of vacuum refining vessels 16, 18 located downstream of the upstream vessel 12 and upstream of the downstream vessel 14. In certain embodiments, as illustrated in FIG. 1, the plurality of vacuum refining vessels 16, 18 is configured in parallel. FIG.

1 illustrates an embodiment that makes use of two vacuum refining vessels 16, 18, but those skilled in the art will appreciate that more than two vacuum refining vessels may be used. The plurality of vacuum refining vessels 16, 18 are in separate, alternating fluid communication with the upstream vessel 12, where the molten glass can be received into the vacuum refining vessels 16, 18. In an illustrative embodiment, while the upstream vessel 12 is dispensing molten glass into the vacuum refining vessel 16, the other vacuum refining vessel 18 is not receiving molten glass from the upstream vessel 12.

The apparatus 10 additionally comprises a reservoir 20 located downstream of the upstream vessel 12 and upstream of the downstream vessel 14 and the vacuum refining vessels 16, 18. The reservoir 20 is configured to receive molten glass from the upstream vessel 12 and distribute the received molten glass downstream to the vacuum refining vessels 16, 18. The reservoir 20 may be open to atmosphere as schematically shown at an inlet 22, and may include a bottom wall 24 and one or more sidewalls 26 extending upwardly from the bottom wall 24. The walls 24, 26 may be composed of refractory materials 25, at least in portions that contact the molten glass. Also, the reservoir 20 may include a first outlet 28 in the bottom wall 24 at one side of the reservoir 20, and a second outlet 30 in the bottom wall 24 at another side of the reservoir 20. Moreover, the reservoir 20 may include first and second glass distributors 32, 34 corresponding to the first and second outlets 28, 30, to control flow of glass out of the reservoir 20. In the illustrated embodiment, the distributors 32, 34 may include plungers 33, 35 but those of ordinary skill in the art will appreciate that the distributors 32, 34 may include any suitable types of valves or other devices to control molten glass flow. Although not separately shown, the plungers 33, 35 may be driven by electro-mechanical, hydraulic, or any other suitable type(s) of actuators, which, in turn, may be controlled by any suitable machine controller(s).

This system of alternating fluid communication between upstream vessel 12 and downward vacuum refining vessels 16, 18 may be accomplished through the aid of the reservoir 20 and its plungers 33, 35, valves, vacuum pumps, evacuation systems, and the like. Valve(s) may be used to prevent unwanted backward (i.e. upstream) flow of molten. glass, and/or prevent unwanted downstream flow of molten glass. It also may be applicable that the flow of molten glass occurs naturally from the principle that fluids will move from areas of higher pressure to areas of lower pressure. A vacuum pump and evacuation system may help maintain a suitably low pressure environment within the apparatus, and may even continuously draw off gases that are released from the molten glass as it flows through the apparatus 10. The evacuated gases may be captured and stored in a tank for future reuse or sale. One or more vacuum ports may be provided in the apparatus 10 for removing or evacuating gases therefrom, for instance, through walls of the vessels 16, 18.

The vacuum refining vessels 16, 18 are located upstream of the downstream vessel 14 in separate, alternating fluid communication with the downstream vessel 14, where the molten glass in vacuum refining vessels 16, 18 is received into the downstream vessel 14. In an illustrative embodiment, when the downstream vessel 14 is receiving molten glass from the vacuum refining vessel 16, it is not also receiving molten glass from the vacuum refining vessel 18. This system of alternating fluid communication between vacuum refining vessels 16, 18 and downstream vessel 14 may be accomplished through the aid of any suitable valves, vacuum pumps, and evacuation systems, for instance, as discussed above.

Figure 2:
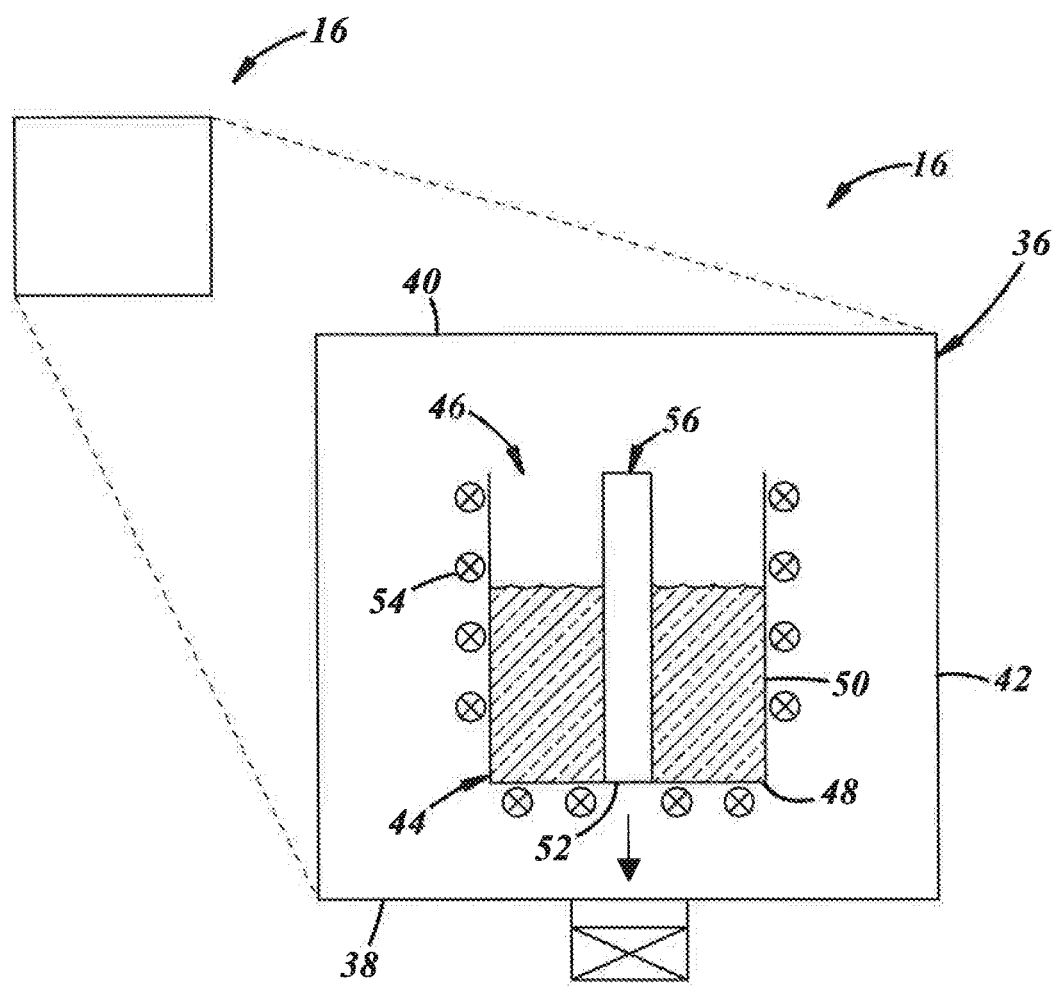
FIG. 2 is a schematic view illustrating one of the vacuum refining vessels of FIG. 1.

With reference to FIG. 2, one or both of the refining vessels, for instance, the first vacuum refining vessel 16, may include one or more vacuum chambers 36 that may include a bottom wall 38, a top wall 40, and one or more sidewalls 42 extending between the bottom and top walls 38, 40. The vessel 16 also may include a molten glass receiver 44 that may be open at an inlet 46, and may include a bottom wall 48 and one or more sidewalls 50 extending upwardly from the bottom wall 48. An outlet 52 of the receiver 44 may be provided in the bottom wall 48. The walls 48, 50 may be composed of refractory materials (FIG. 1 (25)), at least in portions that contact the molten glass. Additionally, the vessel 16 may include one or more heating elements 54, for instance, disposed adjacent exterior surfaces of the walls 48, 50, to maintain temperature of molten glass in the receiver 44 at a desired level. Furthermore, the vessel 16 may include a glass distributor 56 corresponding to the outlet 52 of the receiver 44. In the illustrated embodiment, the distributor 56 includes a plunger, similar to plungers 33, 35, but those of ordinary skill in the art will appreciate that the distributor 56 may include a valve or another device suitable to control glass flow. Although not separately shown, the plunger may be driven by electro-mechanical, hydraulic, or any other suitable type(s) of actuators, which, in turn, may be controlled by any suitable machine controller(s).

The refining vessels 16, 18 preferably are not in direct communication with one another, and preferably are operated in a mutually exclusive manner to provide a continuous flow of refined molten glass toward the downstream vessel 14. In certain embodiments, the vacuum refining vessels 16, 18 are maintained at dissimilar pressure states, for example, alternating between sub-atmospheric and atmospheric pressure (or even super-atmospheric pressure) states. For example, when the vacuum refining vessel 16 is at an atmospheric (or super-atmospheric) pressure state (e.g., 760 Torr), the molten glass contained therein is being discharged therefrom into the downstream vessel 14. At the same time, the vacuum refining vessel 18 may be at a sub-atmospheric state, where the molten glass contained therein is undergoing vacuum degassing. The vacuum refining vessel 18 may also be receiving molten glass from the upstream vessel 12 while in the sub-atmospheric state. Introducing the stream of molten glass into the vacuum refining vessel 18 at sub-atmospheric pressure may cause gaseous inclusions in the stream of molten glass to rise to a surface thereof and escape. It will be appreciated that the roles of vacuum refining vessels 16, 18 can be reversed in the example above, where refining vessel 18 is at atmospheric (or super-atmospheric) pressure and refining vessel 16 is at sub-atmospheric pressure. Additionally and/or alternatively, both refining vessels 16, 18 could be simultaneously maintained in a sub-atmospheric state, for example, at the same or different desired vacuum levels.

In one embodiment, when a vacuum refining vessel is at a sub-atmospheric state, a desired vacuum level may be in a range of 10 to 760 Torr, including all ranges, subranges, endpoints, and values therebetween, for instance 100 Torr. Moreover, the desired level of vacuum may be achieved by gradually decreasing pressure, for instance over a one-hour span to avoid excess foaming of the molten glass. Also, after the desired level of vacuum is achieved, the vacuum level may be maintained over a hold-time, for instance, 30 minutes. Thereafter, the vacuum refining vessel may be vented back to atmospheric pressure before releasing molten glass therefrom, to the downstream vessel 14. Use of the multiple refining vessels in parallel allows the gradual decreasing of pressure within each individual refining vessel to the desired low pressure to avoiding foaming and maintaining the hold time, while synchronizing the multiple refining vessels and the alternating refining process to provide a continuous flow of refined molten glass to the downstream vessel 14.

While it may be preferable to operate the refining vessels 16, 18 mutually exclusively with respect to each other, it is also possible to operate the vessels 16, 18 simultaneously, or at the same time, such that refined molten glass flows from the reservoir 20, into the refining vessels 16, 18, and into the downstream vessel 14. In this aspect, it is also possible to maintain the refining vessels 16, 18 at similar or dissimilar pressure states.

The process of FIG. 1 can be understood with reference to the above description of the apparatus of FIG. 1. The process of FIG. 1 includes containing molten glass in an upstream vessel, for instance, a glass melter. The process also includes distributing the molten glass to a first of at least two vacuum refining vessels downstream of the upstream vessel, and vacuum refining the molten glass in the first vacuum refining vessel. The process further includes discharging molten glass from a second of the at least two vacuum refining vessels into a downstream vessel, wherein the first and second vacuum refining vessels are in separate, alternating fluid communication with the upstream vessel, and wherein the first and second vacuum refining vessels are in separate, alternating fluid communication with the downstream vessel.

There thus has been disclosed an apparatus and process for refining molten glass. The disclosure has been presented in conjunction with presently preferred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. An apparatus to refine molten glass, comprising:
an upstream vessel to contain molten glass;
a downstream vessel arranged downstream of the upstream vessel; and
a plurality of vacuum refining vessels located downstream of the upstream vessel in separate, alternating fluid communication therewith, and located upstream of the downstream vessel in separate, alternating fluid communication therewith, and wherein the plurality of vacuum refining vessels are operated in a mutually exclusive manner to provide a continuous flow of refined molten glass toward the downstream vessel, wherein the plurality of vacuum refining vessels includes a first vessel and a second vessel, and wherein the first vessel is in an atmospheric or super-atmospheric pressure state where the refined molten glass contained therein is being discharged therefrom into the downstream vessel and the second vessel is in a sub-atmospheric pressure state where the molten glass contained therein is undergoing vacuum degassing.

2. The apparatus of claim 1, wherein the upstream vessel is part of a glass melting apparatus.

3. The apparatus of claim 2, wherein the glass melting apparatus includes a submerged combustion melter that melts solid batch materials into the molten glass.

4. The apparatus of claim 1, wherein the downstream vessel includes a molten glass conditioner that conditions the refined molten glass.

5. The apparatus of claim 1, wherein the downstream vessel includes a molten glass forehearth that distributes the refined molten glass to a downstream process.

6. The apparatus of claim 1, wherein the downstream vessel includes a molten glass conduit that delivers the refined molten glass to a forming machine.

7. The apparatus of claim 1, wherein at least two of the plurality of vacuum refining vessels are configured in parallel.

8. The apparatus of claim 1, wherein at least one vacuum pump is in fluid communication with at least one of the plurality of vacuum refining vessels.

9. The apparatus of claim 1, further comprising a reservoir located downstream of the upstream vessel and upstream of the downstream vessel and the plurality of vacuum refining vessels, and to receive molten glass from the upstream vessel and distribute the received molten glass downstream to the plurality of vacuum refining vessels, wherein the reservoir is open to atmosphere at an inlet, and includes first and second outlets and first and second glass distributors corresponding to the first and second outlets to control flow of glass out of the reservoir.

10. The apparatus of claim 1, wherein the plurality of vacuum refining vessels are not in direct fluid communication with one another during operation of the plurality of vacuum refining vessels.

11. The apparatus of claim 1, wherein the plurality of vacuum refining vessels are maintained at dissimilar pressure during operation of the plurality of vacuum refining vessels.

12. An apparatus to refine molten glass, comprising:
an upstream vessel to contain molten glass;
a downstream vessel arranged downstream of the upstream vessel; and
a plurality of vacuum refining vessels located downstream of the upstream vessel in separate, alternating fluid communication therewith, and located upstream of the downstream vessel in separate, alternating fluid communication therewith, and wherein the plurality of vacuum refining vessels are not in direct fluid communication with one another, and wherein the plurality of vacuum refining vessels are operated in a mutually exclusive manner to provide a continuous flow of refined molten glass toward the downstream vessel, wherein the plurality of vacuum refining vessels includes a first vessel in an atmospheric pressure state where the refined molten glass contained therein is being discharged therefrom into the downstream vessel, and a second vessel in a sub-atmospheric pressure state where the molten glass contained therein is undergoing vacuum degassing.

13. An apparatus to refine molten glass, comprising:
an upstream vessel to contain molten glass;
a downstream vessel arranged downstream of the upstream vessel; and
a plurality of vacuum refining vessels located downstream of the upstream vessel in separate, alternating fluid communication therewith, and located upstream of the downstream vessel in separate, alternating fluid communication therewith, and wherein the plurality of vacuum refining vessels are operated in a mutually exclusive manner to provide a continuous flow of refined molten glass toward the downstream vessel, wherein the plurality of vacuum refining vessels includes a first vessel and a second vessel, and wherein the second vessel is in an atmospheric or super-atmospheric pressure state where the refined molten glass contained therein is being discharged therefrom into the downstream vessel and the first vessel is in a sub-atmospheric pressure state where the molten glass contained therein is undergoing vacuum degassing.

14. A process for refining molten glass including:
(a) containing molten glass in an upstream vessel;
(b) distributing the molten glass to a first of at least two vacuum refining vessels downstream of the upstream vessel, and vacuum refining the molten glass in the first vacuum refining vessel; and
(c) discharging refined molten glass from a second of the at least two vacuum refining vessels into a downstream vessel, wherein the first and second vacuum refining vessels are in separate, alternating fluid communication with the upstream vessel, and wherein the first and second vacuum refining vessels are in separate, alternating fluid communication with the downstream vessel, wherein the at least two refining vessels are operated in a mutually exclusive manner to provide a continuous flow of refined molten glass toward the downstream vessel, and wherein the first vacuum refining vessel is in an atmospheric or super-atmospheric pressure state where the refined molten glass contained therein is being discharged therefrom into the downstream vessel and the second vacuum refining vessel is in a sub-atmospheric pressure state where the molten glass contained therein is undergoing vacuum degassing.

15. The process of claim 14, wherein the upstream vessel is part of a glass melting apparatus.

16. The process of claim 15, wherein the glass melting apparatus includes a submerged combustion melter that melts solid batch materials into the molten glass.

17. The process of claim 14, wherein the downstream vessel includes a molten glass conditioner that conditions the refined molten glass.

18. The process of claim 14, wherein the at least two vacuum refining vessels are configured in parallel.

19. The process of claim 14, wherein at least one vacuum pump is connected to at least one of the at least two vacuum refining vessels.

20. The process of claim 14, further including the step of receiving molten glass from the upstream vessel in a reservoir located downstream of the upstream vessel and upstream of the downstream vessel and the at least two vacuum refining vessels.

21. The process of claim 20, further including the step of distributing the received molten glass from the reservoir downstream to the at least two vacuum refining vessels.

* * * * *